United States Patent
Schreiber

[19]

[11] Patent Number: 6,109,876
[45] Date of Patent: Aug. 29, 2000

[54] HELICOPTER SWASH PLATE WITH INTEGRATED PUMP

[75] Inventor: Thomas Schreiber, Kassel, Germany

[73] Assignee: ZF Luftfahrttechnik GmbH, Calden, Germany

[21] Appl. No.: 09/155,060

[22] PCT Filed: May 2, 1997

[86] PCT No.: PCT/EP97/02254

§ 371 Date: Sep. 17, 1998

§ 102(e) Date: Sep. 17, 1998

[87] PCT Pub. No.: WO97/43177

PCT Pub. Date: Nov. 20, 1997

[30] Foreign Application Priority Data

May 10, 1996 [EP] European Pat. Off. ............ 196 18 810

[51] Int. Cl.[7] .................................................. B63H 3/00
[52] U.S. Cl. .......................................... 416/114; 416/114
[58] Field of Search ..................... 416/114, 115, 416/134 A, 141; 417/273, 470; 92/72; 74/55

[56] References Cited

U.S. PATENT DOCUMENTS

| | | | |
|---|---|---|---|
| 4,243,358 | 1/1981 | Carlock et al. | 416/114 |
| 4,274,808 | 6/1981 | Garner et al. | 416/114 |
| 4,362,085 | 12/1982 | Venuti, Jr. | 91/186 |
| 5,011,373 | 4/1991 | Aubry et al. | 416/108 |

FOREIGN PATENT DOCUMENTS

| | | |
|---|---|---|
| 0 471 098 A1 | 2/1992 | European Pat. Off. . |
| 89 09 165 | 1/1990 | Germany . |
| 2 032 374 | 5/1990 | United Kingdom . |
| WO 95/16167 | 6/1995 | WIPO . |

OTHER PUBLICATIONS

Japanese Abstracts, Publ. No. 07040896A, dated Feb. 10, 1995, Japan Aviation Electron Ind.Ltd.

Presentation at the 39th Annual Forum of the American Helicopter Society, St. Louis, Missouri, May 1983, "On Developing and Flight Testing a Higher Harmonic Control System", pp. 3–19.

*Primary Examiner*—Edward K. Look
*Assistant Examiner*—James M McAleenan
*Attorney, Agent, or Firm*—Davis and Bujold

[57] ABSTRACT

In a helicopter with the rotor blades controlled by a swash plate with a stationary part (11) and a rotary part (9) and hydraulic adjusters (4) in a stationary part of the helicopter or in a rotating system, it is proposed to fit a pump, especially a multi-cylinder reciprocating piston pump, between the stationary part (11) and the rotary part (9) of the swash plate. Besides reducing space needs, weight and costs, this provides a short, reliable oil distribution system to the consumers.

14 Claims, 2 Drawing Sheets

HELICOPTER SWASH PLATE WITH INTEGRATED PUMP

The invention concerns a helicopter.

BACKGROUND OF THE INVENTION

The core part of a helicopter is the main rotor. With its two and more blades hinged on a rotor head and supported for pivotal movement about their longitudinal axes, to provide lift and propulsion. To produce or increase thrust for the lift, the pitch of the rotor blades is adjusted collectively, that is, synchronously. The lift of the aircraft is produced by increasing the thrust vector of the blades with the aid of a control which synchronously alters the pitch of the rotor blades.

The helicopter pilot controls the rotor blades by a swash plate comprising a rotary axially movable and tiltable part, supported by radial and axial bearings on a stationary part mounted to a gear housing, which by so called scissors controls the pitch of the blades, the blades being driven by a rotor mast. The rotary part is secured to the rotor head by another set of a scissors.

The movement of the swash plate is transmitted, via a lever mechanism, to the blade connections located at the rotor blade input correction before or behind the blade fixtures, in a manner such that the angle of incidence of the rotor blade increases or decreases with the adjustment of the swash plate.

For a flying manoeuvre, the helicopter pilot adjusts the swash plate by a single lever mechanism. In progressive rotor systems, parallel to said mechanism are disposed hydraulic servomotors which, on one hand, facilitate the control and, on the other, make possible a superimposed regulation, which counteracts the rotor blade oscillations that otherwise occur. To this end, hydraulic servomotors and active hydraulic dampers which are situated in the rotating system, individually control separate rotor blades.

One or more gas turbines drive the main rotor, via a gear and a main rotor mast, which is rotatably supported in the gear housing and on which is fixed the rotor head.

The hydraulic servomotors and active hydraulic dampers need hydraulic power of about 1% of the main rotor power. Separate pumps are used for this. These have a considerable weight and demand substantial installation space. In addition, the feed-in lines to the servomotors are often long and complex, especially when they pass from a stationary part to a rotary part.

The problem, on which the invention is based, is to supply the hydraulic motors and active dampers with the required power, to save weight, to reduce construction costs and to improve efficiency.

SUMMARY OF THE INVENTION

In the helicopter, according to the invention, the relative movement between both parts of the swash plate is used to power a pump. Even though all kinds of pumps, capable of producing the required pressure, are possible, reciprocating pumps, both in axial and in radial designs, are especially adequate. In this case, the pistons and cylinders form a working space. The pistons are actuated by a cam track on a plate in the case of axial reciprocating pumps and on a cam ring in the case of a radial reciprocating pump. Thereby the working spaces increase and decrease whereby the pumping effect is produced.

The position of the pump is distinguished by the fact that the size of the swash plate is either not increased or only very slightly. In addition, the connecting passages to the servomotors are very short both in the stationary part of the helicopter and in the rotating system. If the pump is used only for supplying consuming devices in the rotating system, the cylinders are conveniently located in the rotary part of the swash plate, thereby avoiding expensive pressurized oil connections between the rotating and stationary parts.

Since the speed of the main rotor is limited by the load capacity of the rotor blades and the velocity of the rotor blade ends, a sufficient number of cylinders and/or cams must be distributed on the periphery in one or two serial arrangements. By using numerous cylinder units a uniform flow rate is achieved and this overcomes the danger of oscillations on start up. This danger is further reduced if the cylinders are at irregular distances (unequal number of cylinders and cams) from each other.

The pistons conveniently have spherical front faces with which they slide over the cam tracks in order better to be able to follow them. Roller bodies in the form of balls or rollers and roller bearings may be used to significantly reduce friction and wear.

The cam track and the bearing races of the pistons, are protected against soiling and lubrication thereof is ensured if the cam track is situated between outwardly sealed radial and axial bearings.

For different uses and operating conditions, it is convenient that the power of the pump be adaptable to the requirements. This can be achieved by the pump being controlled by valves and individual cylinders being connected in series, or parallel, or short circuited. Flat spring valves are light, require little space and can be easily produced. Flow rate regulation on the suction side of the pump especially saves energy.

On the pressure side of the pump, an annular duct connects the outlet ducts of the individual cylinders. But there can also be provided several annular ducts which combine the cylinders by groups. The annular ducts can, at the same time, serve as collecting spaces for the pressurized oil and optionally are designed as canceling chambers to absorb oscillations and stabilize flow rate.

For safety reasons, the pump must not be able to lock the rotor. Therefore, according to one design, it is provided that the cam track be connected with the swash plate by means of shear pins or such. A similar solution consists in there being disposed between the pistons and the cam track flexible elements which flex as soon as a maximum admissible pressure is exceeded.

Should the pump fail, the primary control task of the helicopter can be maintained by the mechanical pivoting of the swash plate. But if primary tasks, such as lubrication, trimming, or stabilization, have been mechanically taken over in the rotor head, it is convenient to provide pressure storage which, in an emergency, maintains the pressure supply at least for a limited time and makes possible a safe landing of the helicopter.

Numerous features in this connection are shown in the specification and in the claims. In accordance with the problems to be solved, the expert will conveniently regard the combined features separately and make logical additional combinations.

BRIEF DESCRIPTION OF THE DRAWING(S)

An embodiment of the invention is shown in the drawings. In the drawings.

DESCRIPTION OF THE PREFERRED EMBODIMENT(S)

Figure 1:
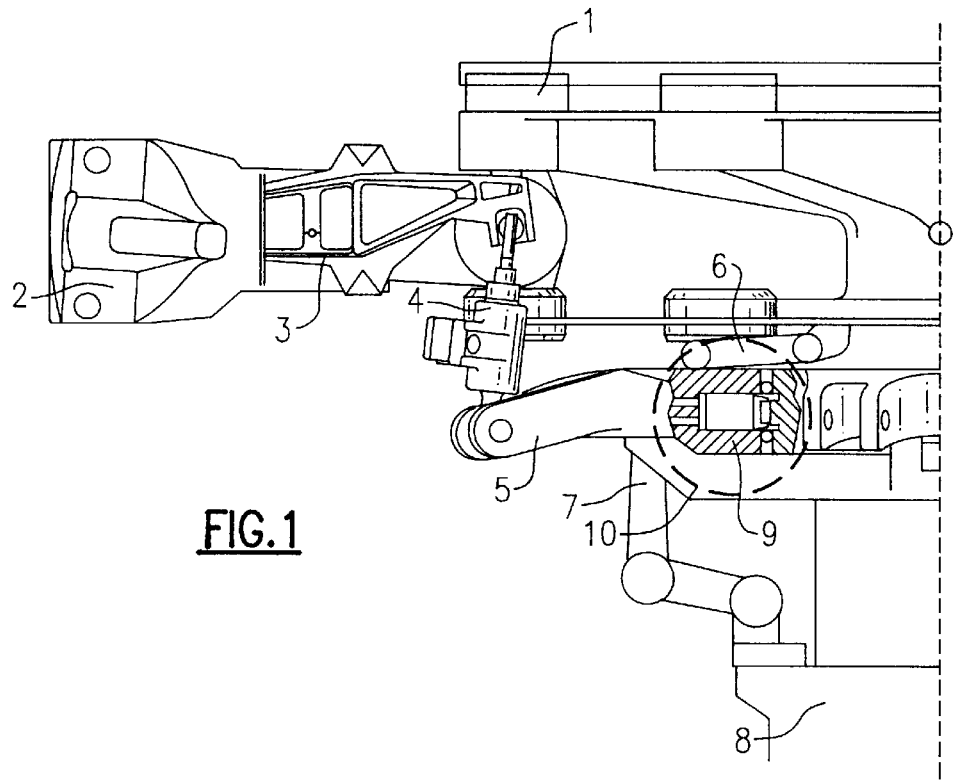
FIG. 1 is a partial view of a helicopter rotor head.
Figure 2:
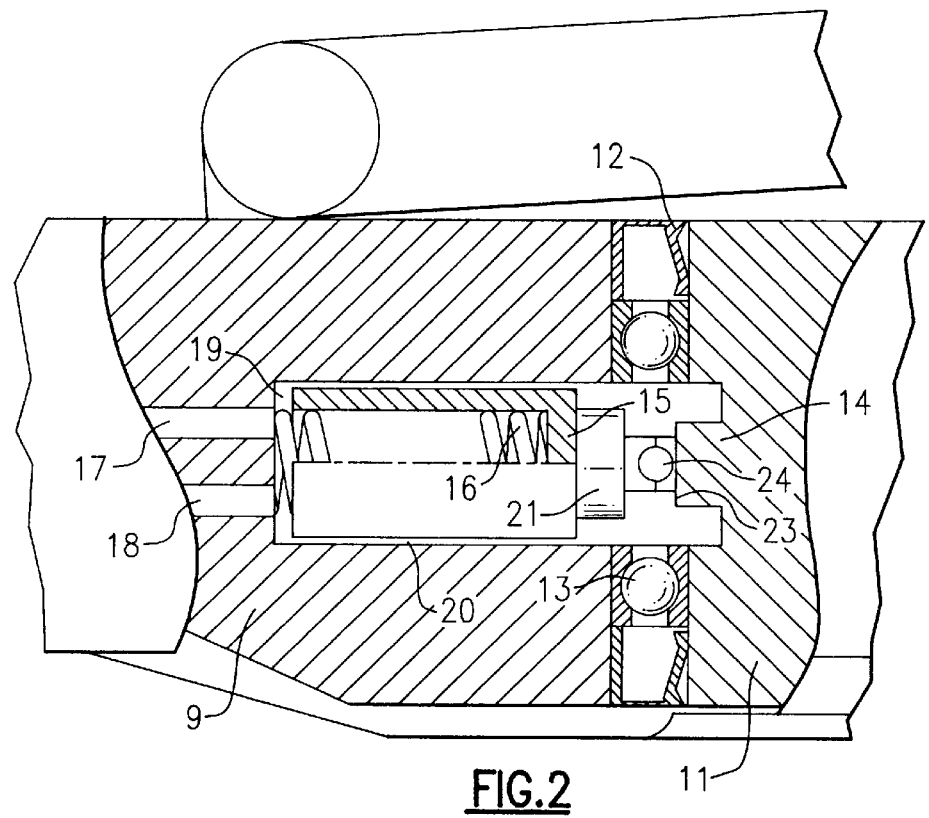
FIG. 2 is a section 10 according to FIG. 1.
Figure 3:
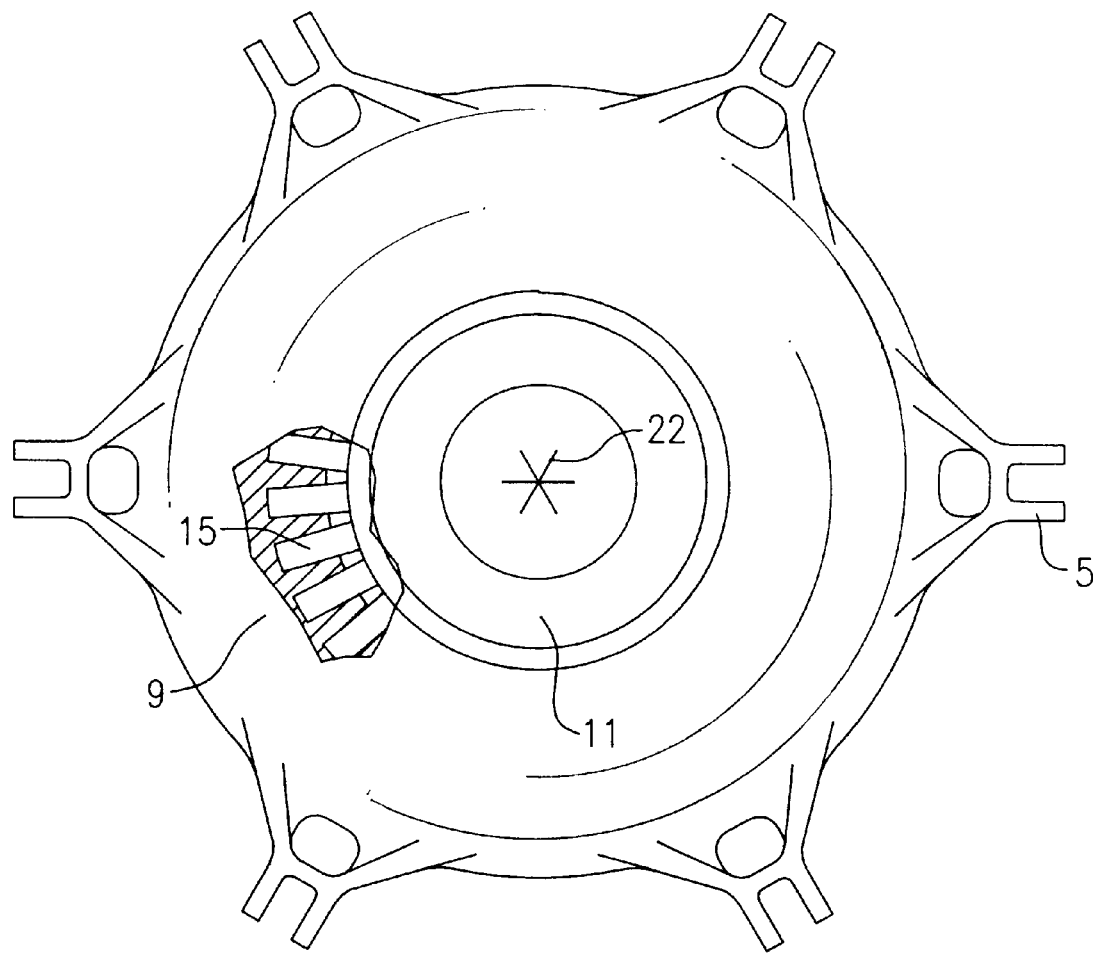
FIG. 3 is a rotary part of a swash plate.

A rotor head 1 of a main rotor of a helicopter on which the rotor blades are each hinged, via a rotor blade fixture 2, is not shown in detail. The latter has a tilting lever 3 with which it is pivotable with the rotor blade about its longitudinal axis.

The tilting lever 3 engages, via a joint, a hydraulic adjuster 4, which is pivoted on one bracket 5 of a rotary part 9 of a swash plate. The rotary part 9 is supported against a stationary part 11 of the swash plate by axial and radial bearings 13. Seals 12 outwardly of the axial and radial bearings seal the area.

So-called scissors 7 hold fast the stationary part 11 of the swash plate on a gear housing 8, while allowing the swash plate be axially moved and pivotable moved in all directions relative to the main rotor mast 22. The rotary part 9 is rotated by the rotor head 1, via other scissors.

If the swash plate is axially moved, the movement is conveyed by the bracket 5, the hydraulic adjuster 4 and the tilting lever 3 to all rotor blades to collectively adjust the in angle of incidence. On the other hand, if the swash plate is pivoted, the angle of incidence of each rotor blade oscillates, during each rotor revolution, between a maximum and a minimum. This latter is called cyclic control which for different flying states provides uneven flow rate of the rotor the trimming control.

Between the rotary part 9 and the stationary part of the swash plate is situated a multi-cylinder radial reciprocating pump. Its power parts, piston 15 and cylinder 20, are in the rotary part 9 and enclose working spaces 19. Springs 16 press the pistons against a cam track 23, toward a ring 14, which is non-rotatably connected with the stationary part 11. During rotation of the rotary part 9, cams of the cam track actuate the pistons 15 whereby the working spaces 19 decrease and increase to generate a pumping effect. Tappets 21, in which balls 24 are supported, are provided between the cam track 23 and the piston 15. These balls reduce friction and wear and ensure that the pistons 15 with their tappets 21 follow the cam track 23.

Hydraulic oil is fed, via suction ducts 17, and is conveyed, via pressure ducts 18, to the hydraulic adjusters 4. The ducts 17, 18 discharge in annular ducts, not shown, which can be designed as collecting and canceling chambers, both on the suction side and on the pressure side. Valves, not shown, which are conveniently designed as flat spring valves, control the suction side and the pressure side of the pump. Separate pump units can be connected in series or in parallel.

The ring 14, shown with the cam track 23, may be designed integrally with the stationary part 11. To prevent the rotor from being locked by the pump, it is convenient to design the ring 14 as a separate part and non-rotatably connect it with the stationary part 11 with shear pins or similar safety elements. Another means for preventing locking consists in that the tappet has a flexible element which is flexed, to control pressure, by the cams as soon as the highest admissible pressure has been exceeded.

The radial reciprocating pump shown can be modified in a manner that the cam track 23 lies in the rotary part and the cylinders 20 and pistons 15 are situated in the stationary part 11. Then they are not subject to any centrifugal forces. In addition, the pistons 15 and cylinders 20 can be disposed concentrically relative to the axis of rotation in the manner of an axial reciprocating pump. Finally, other kinds of pumps such as vane cell pumps, etc., could be used.

| Reference numerals | |
|---|---|
| 1 rotor hear | 12 seal |
| 2 rotor blade fixture | 13 radial/axial bearing |
| 3 tilting lever | 14 ring |
| 4 hydraulic adjuster | 15 piston |
| 5 bracket | 16 springs |
| 6 scissors | 17 suction duct |
| 7 scissors | 18 pressure duct |
| 8 housing | 19 working space |
| 9 rotary part of the swash plate | 20 cylinder |
| | 21 tappet |
| 10 section | 22 main rotor mast |
| 11 stationary part of the swash plate | 23 cam track |
| | 24 roller body |

What is claimed is:

1. A helicopter rotor head assembly comprising:

at least two rotor blades hinged on a rotor head (1) secured to a main rotor mast (22) which is rotatably supported in a gear housing (8);

a swash plate non-rotatably secured to said main rotor mast (22) and by a stationary part (11) to said gear housing while having axially movably and pivotably in all directions relative to the longitudinal axis of said main rotor mast (22);

a rotary part (9) of said swash plate which is supported for rotation with said rotor head (1), for rotation relative to said stationary part (11) of said swash plate, by axial and radial bearings (13);

wherein between said stationary part (11) and said rotary part (9) of said swash plate a pump is situated having movable parts reciprocal by the relative movement of said stationary and rotary parts (9, 11) of said swash plate in a manner such that a pumping effect occurs in a working space (19) of the pump.

2. The assembly according to claim 1, wherein said pump is a multi-cylinder reciprocal pump having pistons (15) in cylinders (20) which are actuated by a cam track (23), said cylinders (20) and said cam track (23) being situated one on the stationary and one on the rotary part of said swash plate, respectively.

3. The assembly according to claim 2, wherein said cylinders (20) are situated in said rotary part (9) of said swash plate.

4. The assembly according to claim 2, wherein said cylinders (20) are distributed on the periphery at irregular intervals.

5. The assembly according to claim 2, wherein said cam track (23) is situated between the outwardly sealed radial and axial bearings (13).

6. The assembly according to claim 2, wherein said pistons (15) have spherical surfaces contacting said cam track (23).

7. The assembly according to claim 2, wherein roller bodies (24) or a roller bearing are situated between said pistons (15) and said cam track (23).

8. The assembly according to claim 2, wherein said pump is suction regulated.

9. The assembly according to claim 2, wherein the outlet ducts (18) or inlet ducts (17) of said cylinders (20) are connected by annular ducts.

10. The assembly according to claim 2, wherein said annular ducts are designed as collecting spaces or canceling spaces.

11. The assembly according to claim 2, wherein said valves are designed as flat spring valves.

12. The assembly according to claim 11, wherein said flat spring valves are interconnected to form groups.

13. The assembly according to claim 2, wherein said cam track (23), is connected with said swash plate by means of safety elements.

14. The assembly according to claim 13, wherein said safety element is a flexible element between each said piston (15) and said cam track which is flexed to limit pumping pressure as soon as the maximum admissible pressure is exceeded.

* * * * *